Figure 1:
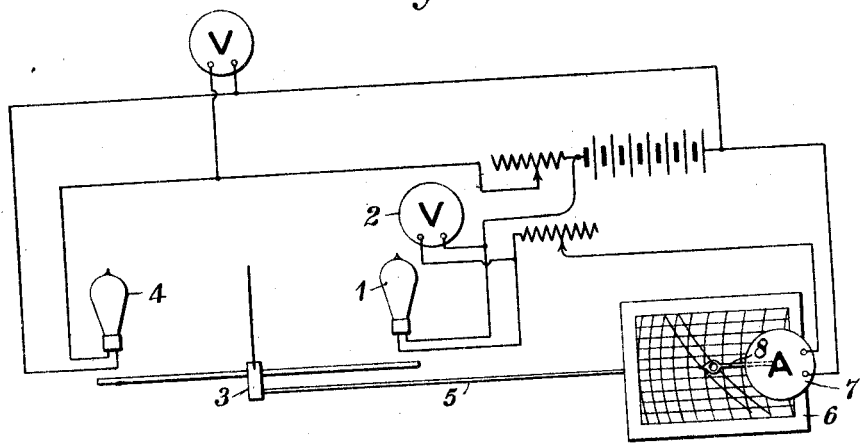

W. G. HOUSKEEPER & H. S. DUNNING.
METHOD OF AND MEANS FOR DETERMINING THE RATINGS OF INCANDESCENT LAMPS.
APPLICATION FILED MAY 16, 1910.

1,091,661.

Patented Mar. 31, 1914.
8 SHEETS—SHEET 1.

WITNESSES:
C. L. Belcher
Otto S. Schauer

INVENTORS
Herbert S. Dunning
William G. Houskeeper
By
ATTORNEY

W. G. HOUSKEEPER & H. S. DUNNING.
METHOD OF AND MEANS FOR DETERMINING THE RATINGS OF INCANDESCENT LAMPS.
APPLICATION FILED MAY 16, 1910.

1,091,661.

Patented Mar. 31, 1914.
8 SHEETS—SHEET 2.

SCALE FOR 50 WATT-2.5 W.P.C. 20 C.P.-115 VOLT METALIZED LAMPS
CHART FOR C.P., TRUE AMPERES, TRUE WATTS AND TRUE W.P.C. AT 115 VOLTS.

CHART FOR 16 C.P.- 4 W.P.C. -110 VOLT CARBON LAMP.
SCALE SHOWS AMP'S AT 4 W.P.C.

CHART FOR 16 C.P.-3.5 W.P.C.-110 VOLT CARBON LAMP
SCALE SHOWS WATTS & CANDLE POWER AT 3.5 W.P.C.

CHART FOR 16 C.P.–3.5 W.P.C. CARBON LAMP
SCALE SHOWS WATTS & CANDLE POWER LIMITS FOR INDIVIDUAL AND AVERAGE
FOR LAMPS OF 105, 110 & 115 VOLTS CLASSES.

UNITED STATES PATENT OFFICE.

WILLIAM G. HOUSKEEPER, OF PHILADELPHIA, PENNSYLVANIA, AND HERBERT S. DUNNING, OF NEW DORP, NEW YORK, ASSIGNORS TO WESTINGHOUSE LAMP COMPANY, A CORPORATION OF PENNSYLVANIA.

METHOD OF AND MEANS FOR DETERMINING THE RATINGS OF INCANDESCENT LAMPS.

1,091,661.  Specification of Letters Patent.  Patented Mar. 31, 1914.

Application filed May 16, 1910. Serial No. 561,736.

*To all whom it may concern:*

Be it known that we, WILLIAM G. HOUSKEEPER and HERBERT S. DUNNING, citizens of the United States, and residents, respectively, of Philadelphia, in the county of Philadelphia and State of Pennsylvania, and of New Dorp, Staten Island, in the county of Richmond and State of New York, have invented a new and useful Improvement in Methods of and Means for Determining the Ratings of Incandescent Lamps, of which the following is a specification.

Our invention relates to methods of and means for photometering or determining the ratings of electric incandescent lamps, and it has for its object to provide a method and means of the character indicated whereby certain electrical characteristics of a lamp may be directly and accurately indicated by a single indicating device.

Electric incandescent lamps have ordinarily been rated in volts and candle power in order that the purchaser or user might be informed as to their adaptability to the circuit in connection with which they were to be used and as to the candle power of light to be expected from them. However, this mode of rating lamps is not entirely satisfactory, because it gives no indication of their efficiency; that is, of the watts consumed per candle power of light.

The efficiency of a lamp or the watts consumed per candle power of light is a very important piece of information with reference thereto, for the reason that the life of a lamp depends upon the temperature of its filament, and the temperature of the filament bears a direct and definite relation to the efficiency, measured in watts consumed per candle power of light. For instance, it is known that lamps of the same efficiency, at a given voltage, have a more uniform life, as well as a greater average life, than lamps which differ in efficiency. The voltage value at which a lamp will have a given efficiency has heretofore been determined usually by a "cut and try" method, or by computation from a single set of measurements, either of which methods is indirect and altogether too expensive to carry out during the manufacture of lamps for ordinary commercial purposes.

According to the present invention, the necessity of making computations in determining the voltage and watts per candle rating of a lamp is avoided, as such information, or any other desired information with reference to a lamp, may be obtained directly and instantly by the reading of but a single instrument, the construction and operation of which is exceedingly simple.

Figure 2:
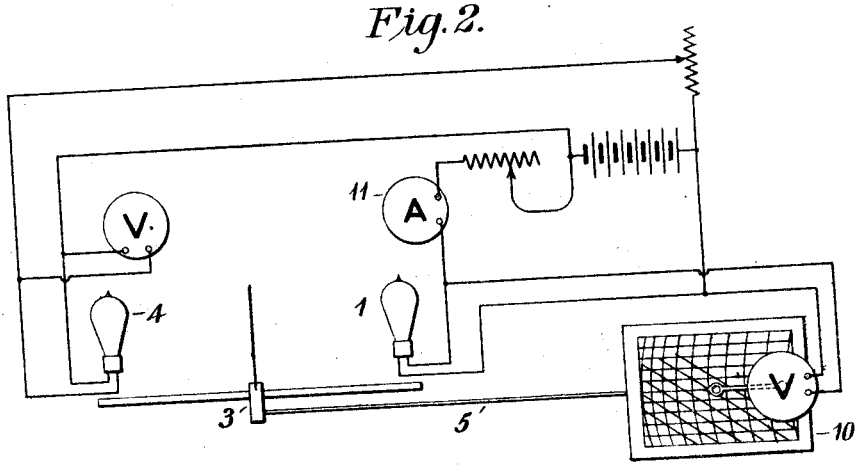

Figure 1 of the accompanying drawing is a diagrammatic view of means embodying the present invention and whereby the same may be practised, and Fig. 2 is a similar illustration of a modification of the means of Fig. 1. Figs. 3, 5, 6, 7, 8 and 9 are face views of as many different kinds of scales or charts for the instruments of Figs. 1 and 2, and Fig. 4 represents the characteristic curves of incandescent lamps of a certain kind, which curves, or others similar thereto, were employed in preparing the charts of Figs. 5 to 9, inclusive.

In practising the method of the present invention, a given voltage is applied to a lamp 1 to be tested, which voltage is measured by a voltmeter 2, and the candle power of the lamp is measured by any suitable photometer having a movable member 3, which, in the present instance, is represented as a screen that is movable between the lamp 1 and a pilot or reference lamp 4. As is usual in photometering lamps, the reference lamp 4 is maintained at a definite candle power, and, accordingly, the position of the screen 3, when the photometer is balanced, gives a direct indication of the candle power of the test lamp 1. Consequently, if the screen 3 carries a scale bearing candle power designations, a stationary pointer adjacent to the scale will indicate thereon the candle power of the lamp under test when the photometer is balanced. Moreover, it is not essential that the pointer should be stationary, as it may serve the same purpose and function if it is pivoted to swing about an axis that is stationary with respect to the scale carried by the photometer screen and is arranged to swing over parallel arcs thereon that bear candle power designations.

In the present instance, the screen 3 of the photometer is connected by means of a rod 5 to the movable scale or chart 6 of an electrical measuring instrument 7 having a pointer 8 that swings about an axis which is perpendicular to the chart 6 and is stationary with respect thereto.

In Fig. 1, the electrical measuring instrument 7 is an ammeter and is connected in series with the lamp 1 to be tested. The deflections of the pointer 8, therefore, indicate upon the scale or chart 6 the amount of current traversing the lamp 7, while the position of the chart, with respect to the end of the pointer, gives an indication of the candle power of the lamp.

Figure 3:
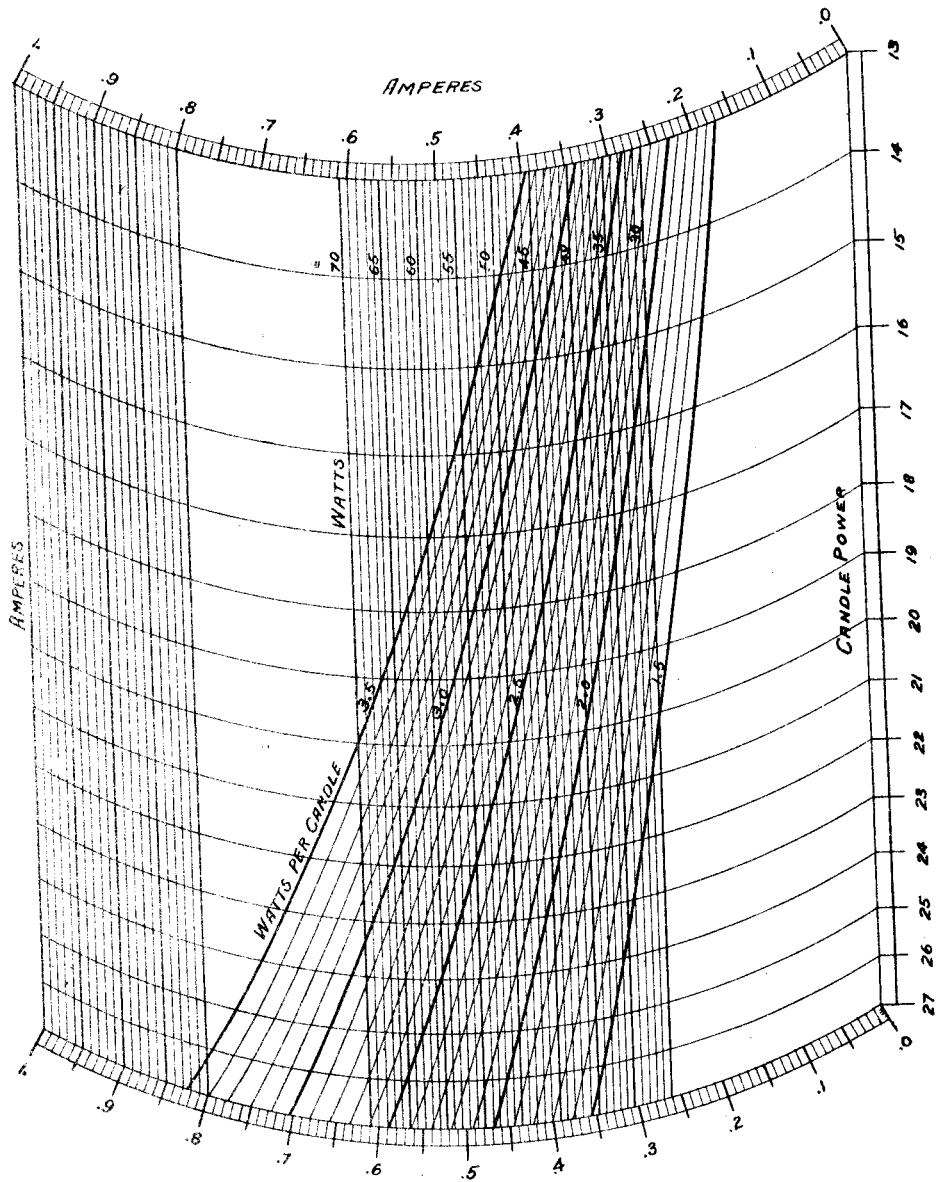
Figure 4:
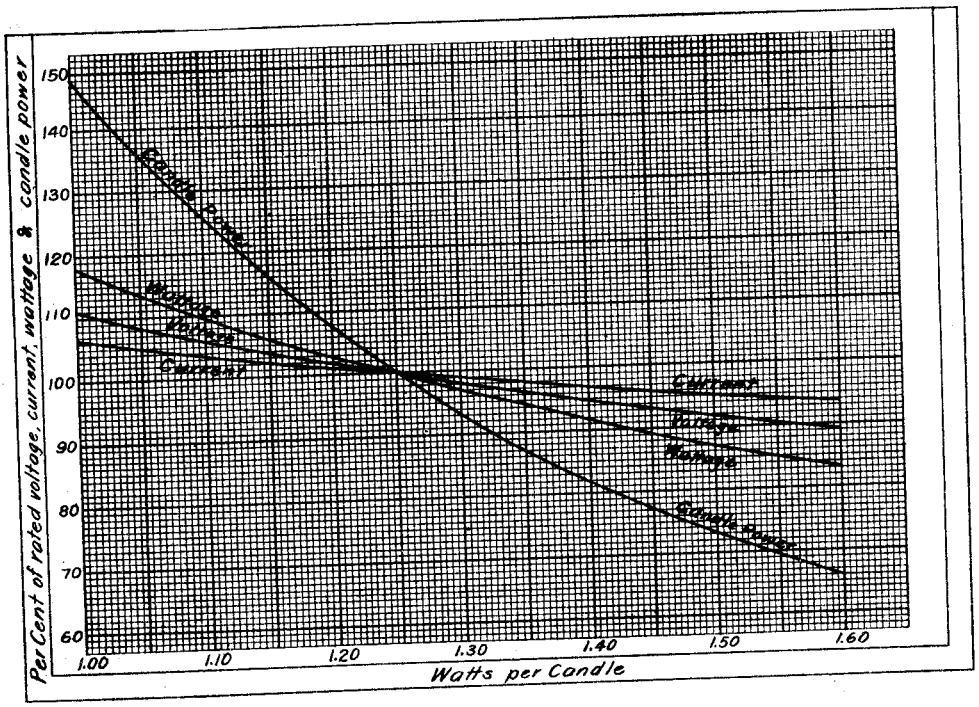

The chart or scale of Fig. 3 is adapted to be used upon the ammeter of Fig. 1 when making measurements upon metallized carbon filament lamps having a nominal rating of 50 watts, 2.5 watts per candle power, 20 candle power and 115 volts. The approximately horizontal arcs are provided on the right of the chart with candle power designations. At the top and bottom of the chart are scales bearing ampere designations. The parallel lines at the left of the chart that connect the points of subdivision of the two ampere scales also represent ampere values, and are useful when it is desired to ascertain the current taken by the lamp.

As the current measurements are made at a constant voltage, which, in the case of Fig. 3, is taken as 115, each of the divisions of the ampere scale corresponds also to a particular wattage. For instance, .4 of an ampere corresponds to .4 times 115, or 46 watts. Consequently, parallel lines may be drawn between the two ampere scales to represent wattage values, such lines being shown near the center of the chart of Fig. 3 and being useful when it is desired to ascertain the watts consumed by the lamp under test. Since at any given wattage the candle power of the lamp under test is also indicated upon the chart, each point upon the chart represents a value of the corresponding watts divided by the corresponding candle power, or the watts consumed by the lamp per candle power of its light, which is a measure of its efficiency. For instance, if a lamp consumes 70 watts when giving a candle power of 20, its efficiency, when measured in watts per candle power, is 3.5. Also, when a lamp consumes 49 watts and gives a candle power of 14, its efficiency measured in watts per candle power is also 3.5. In this manner, many points upon the chart may be determined and lines may be drawn through points representing the same values, the curved diagonal lines upon the chart of Fig. 3 representing such watts per candle values. Thus, by means of this chart, the amperage, wattage, candle power and watts per candle power of a lamp under test, when operated at the voltage for which the chart is calibrated, may be determined from a single indication upon the chart.

The chart of Fig. 3 permits of the immediate ascertainment of electrical values pertaining to a lamp under the particular conditions of its test, but does not provide means for ascertaining information with respect to it when it is operated under other conditions. It is possible, however, to provide a chart or charts whereby electrical values pertaining to the test lamp, if operated under other conditions than those of the test, may be as readily ascertained as the values under test conditions. Such charts are obtained by the use of the characteristic curves of lamps of the kind under test and are dependent for their accuracy upon the fact that the characteristics of all lamps of the same kind are substantially the same.

Fig. 4 represents the characteristic curves of tungsten filament lamps. These curves show the percentages of variation of the voltage, current wattage and candle power of tungsten filament lamps with changes in the efficiency thereof, measured in watts consumed per candle power of light. The 100 per cent. points upon the curves coincide and are located upon the 1.25 watts per candle power ordinate. The curves provide means for determining the percentages of change in the voltage, current, wattage and candle power of lamps that are necessary to effect given changes in the efficiency. For instance, if when 115 volts are applied to a lamp, its efficiency is 1.4 watts per candle power, it will be found, by referring to the characteristic voltage curve of Fig. 4, that the measured voltage, 115, is 95 per cent. of the voltage at which the lamp will give an efficiency of 1.25 watts per candle power. Dividing 115 by .95, it is found that 121 volts should be applied to the lamp to cause it to give an efficiency of 1.25 watts per candle power.

Figure 5:
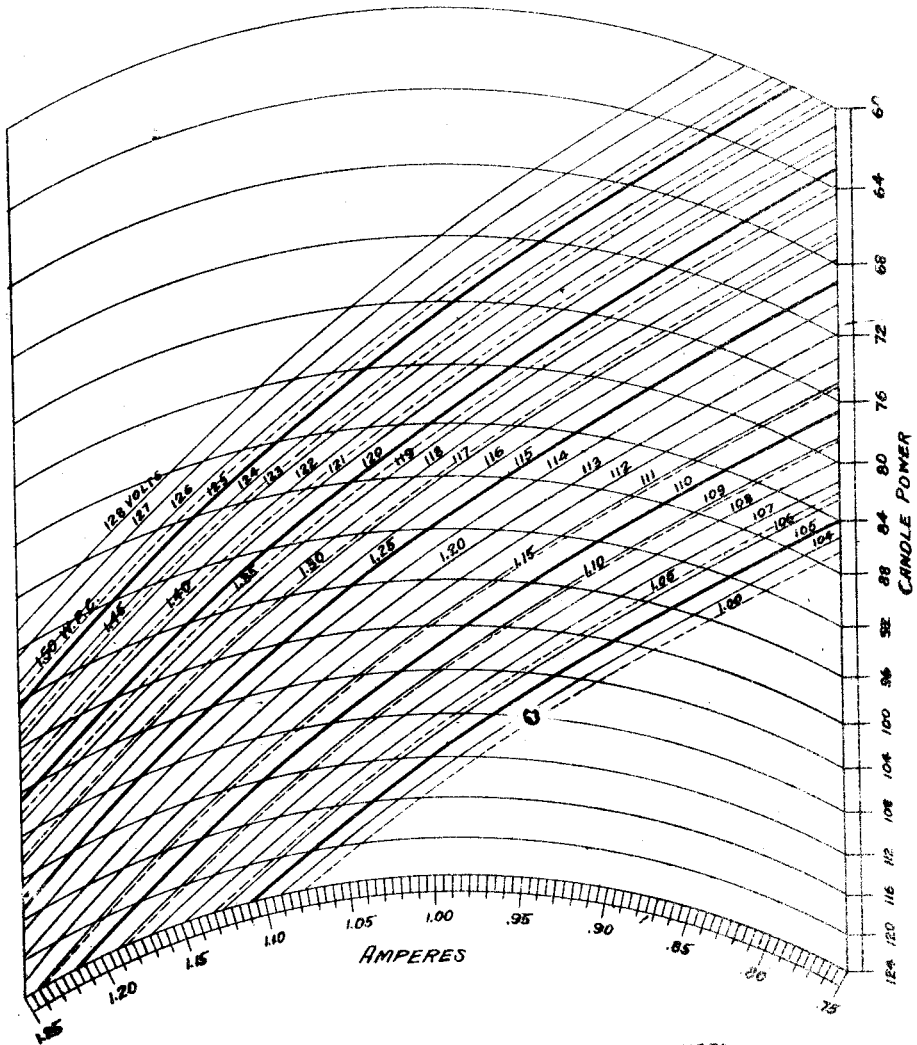

The chart of Fig. 5 provides means for immediately ascertaining the voltage at which the test lamp should be operated in order that it may have a given efficiency, irrespective of the efficiency at which the lamp operates under test conditions. This chart is adapted to be used in the testing of tungsten filament lamps having a nominal rating of 100 watts, 80 candle power, 115 volts and an efficiency of 1.25 watts per candle power. Upon this chart the diagonally curved broken lines, which represent efficiencies in watts per candle power values, were located in a manner which has been described in connection with the chart of Fig. 3, and the full lines which are parallel thereto were located by the use of the characteristic voltage curve of Fig. 4, in a manner which will now be described.

When using this chart, since the candle power of each lamp is measured at 115 volts, the instrument pointer will indicate directly upon the chart the present efficiency of the lamp, in watts per candle power. With the present efficiency of the lamp known, the voltage at which it will give an efficiency of 1.25 watts per candle power may be determined from the characteristic voltage curve of Fig. 4, in a manner that has been above described. For instance, if, when 115 volts are applied to the lamp, its efficiency is 1.3 watts per candle power, it will be found from the characteristic voltage curve that 115 volts is 98 per cent. of the voltage at which the lamp will give an efficiency of 1.25 watts per candle power. Dividing 115 by .98, it is found that, if 117.3 volts are applied to the lamp, it will give the desired efficiency of 1.25 watts per candle power. Therefore, the line representing 1.3 watts per candle power upon the chart of Fig. 5 also represents a voltage of 117.3 at which certain lamps will give an efficiency of 1.25 watts per candle power. In a similar manner, it may be found that each of the other watts per candle lines corresponds to certain rated voltages, but, for convenience, lines representing full or even values of the voltages are drawn parallel to the watts-per-candle lines. Thus, by means of the chart of Fig. 5, the curent, candle power and efficiency of a lamp during the test are indicated by the single pointer, as well as the voltage at which the lamp should be operated in order that it may give an efficiency of 1.25 watts per candle power.

Figure 6:
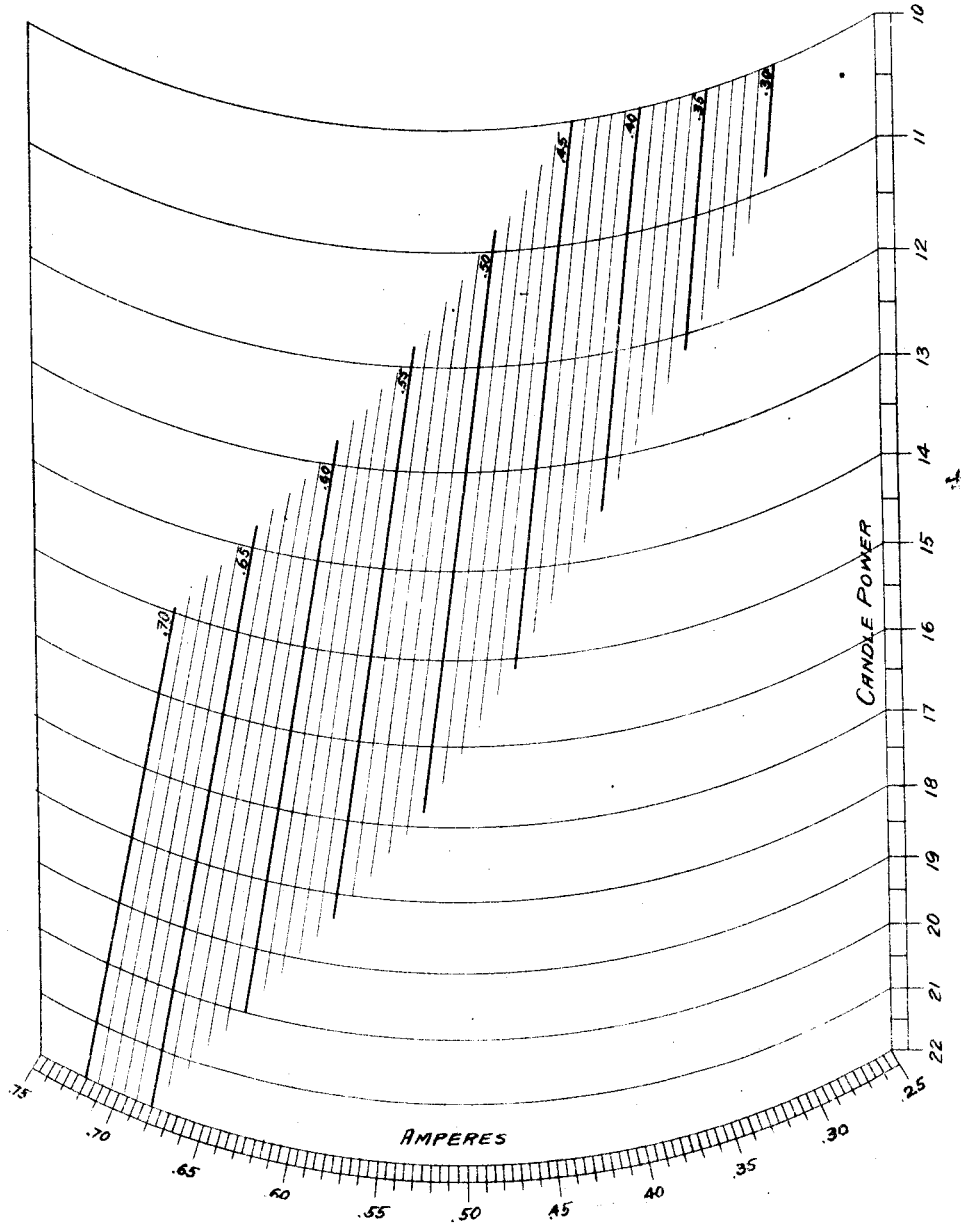
Figure 7:
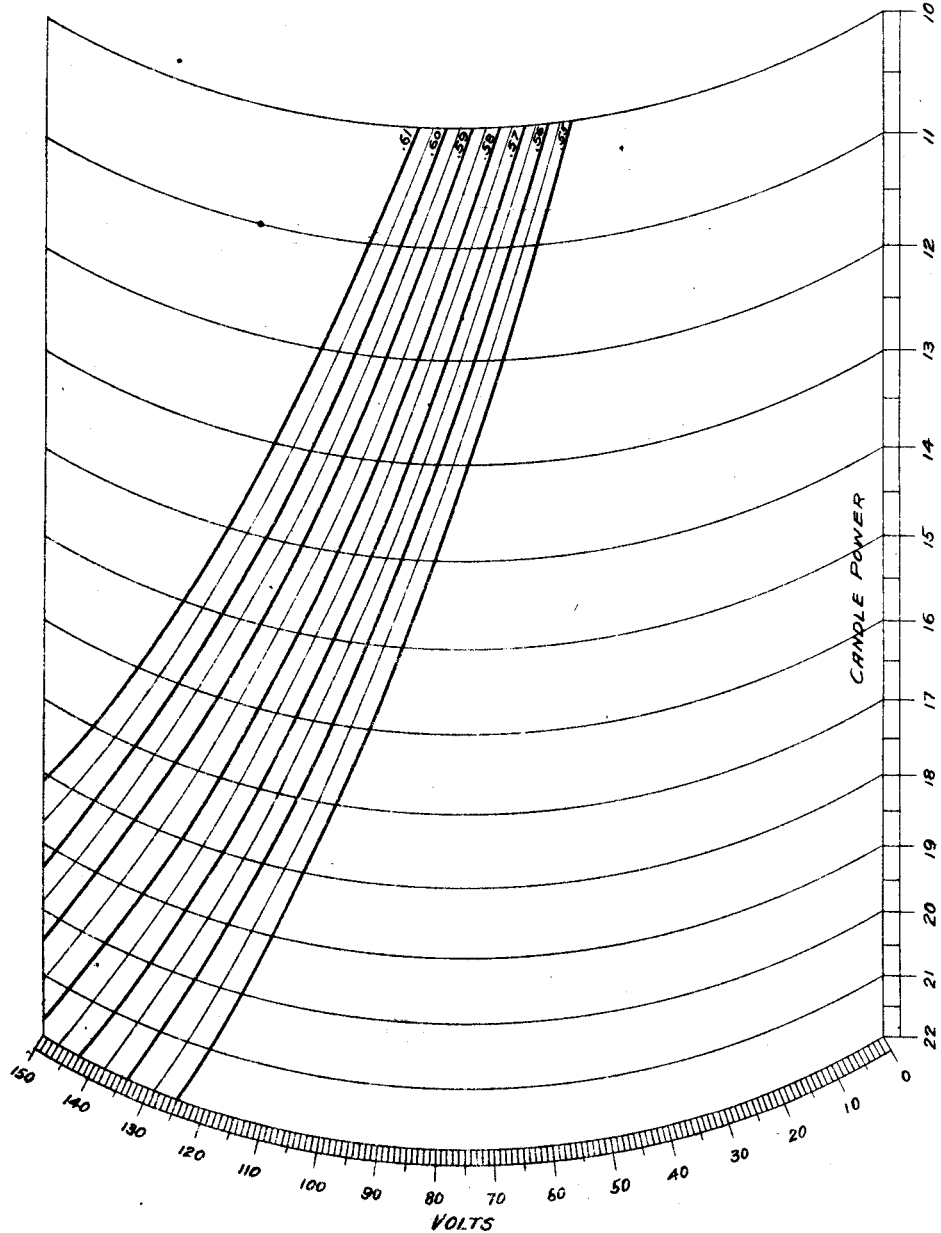

In determining the ratings of lamps adapted to be connected in series, it is usually desirable to mark the lamps with the current values at which they will operate at the given efficiency, and, in Figs. 6 and 7, instrument charts are shown whereby such information may be obtained. The chart of Fig. 6 is adapted to be employed when making measurements upon carbon-filament lamps having a nominal rating of 110 volts, 16 candle power and an efficiency of 4 watts per candle power, and when it is desired to ascertain the current which should traverse a lamp in order that it may have an efficiency of 4 watts per candle power. It was shown, in connection with Figs. 3 and 5, that each position of the instrument pointer corresponds to a certain value of the efficiency of the lamp, and, in determining the locations of the lines upon the chart of Fig. 6 representing current values at which the lamps will give an efficiency of 4 watts per candle power, preliminary or imaginary watts per candle power lines were employed, though they are not shown upon the chart because of the confusion that they would cause. However, if, for any position of the pointer, the corresponding current and watts per candle power are known, by referring to the characteristic current curve (similar to that of Fig. 4), of lamps of the kind with which the chart is adapted to be employed, the percentage of change in the current necessary to cause the lamp to operate at the desired efficiency of 4 watts per candle power may be readily determined in a manner which will be understood from the foregoing description of Figs. 4 and 5. A point representing the current value at which the lamp will give the desired efficiency may then be placed upon the chart beneath the pointer, and a large number of points may be determined in the same manner, after which lines should be drawn through the points representing the same values.

The chart of Fig. 7 is adapted to give the same information as that of Fig. 6, but it is a voltmeter chart rather than an ammeter chart. Consequently, the arrangement of circuits should be as shown in Fig. 2 when the chart of Fig. 7 is employed, in which case the voltage of the test lamp is measured by the voltmeter 10 when the current traversing the lamp is maintained at a constant value of .58 amperes, as measured by an ammeter 11. The curved diagonal lines upon this chart represent current values at which lamps should be operated in order that they may have an efficiency of 4 watts per candle power, and these lines were located in a manner similar to that described for the lines of Fig. 5, except by the employment of the characteristic current curve instead of the characteristic voltage curve of lamps of the kind under test. It will be understood, of course, that, in any case, either the voltage or current may be maintained constant while the other is measured by an instrument having a chart movable with respect to the axis of its pointer, though, since it is usually more convenient to maintain the voltage constant than the current, the arrangement of circuits shown in Fig. 1 will be employed in most cases.

Figure 8:
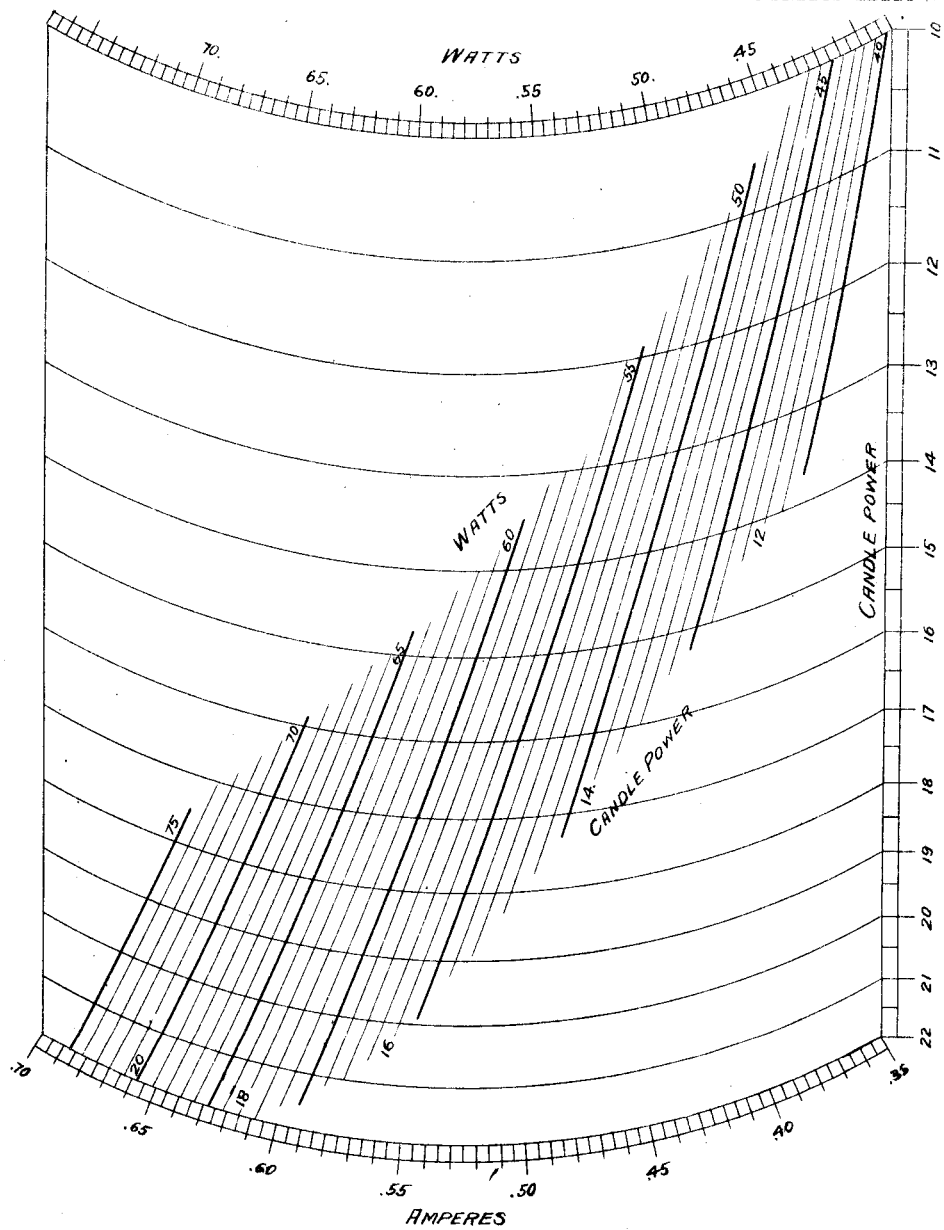

If it is desired to ascertain the number of watts consumed by, or the candle power of, a carbon-filament lamp having a nominal rating of 110 volts, 16 candle power and an efficiency of 3.5 watts per candle power when the lamp is operated at an exact efficiency of 3.5 watts per candle power, a chart like, or similar to, that of Fig. 8 should be employed. It was shown in describing the chart of Fig. 3 that, for each position of the instrument pointer, there are corresponding values of the candle power, watts and watts per candle power of the lamp under test. With these values known with respect to the test lamp, by referring to the characteristic wattage and candle power curves of lamps of the kind under test, the values of the watts and candle power of the lamp, when it is operated at an efficiency of 3.5 watts per candle power, may be determined in a manner similar to that described in connection with Figs. 6 and 7. Lines may then be drawn through points representing the same values.

Figure 9:
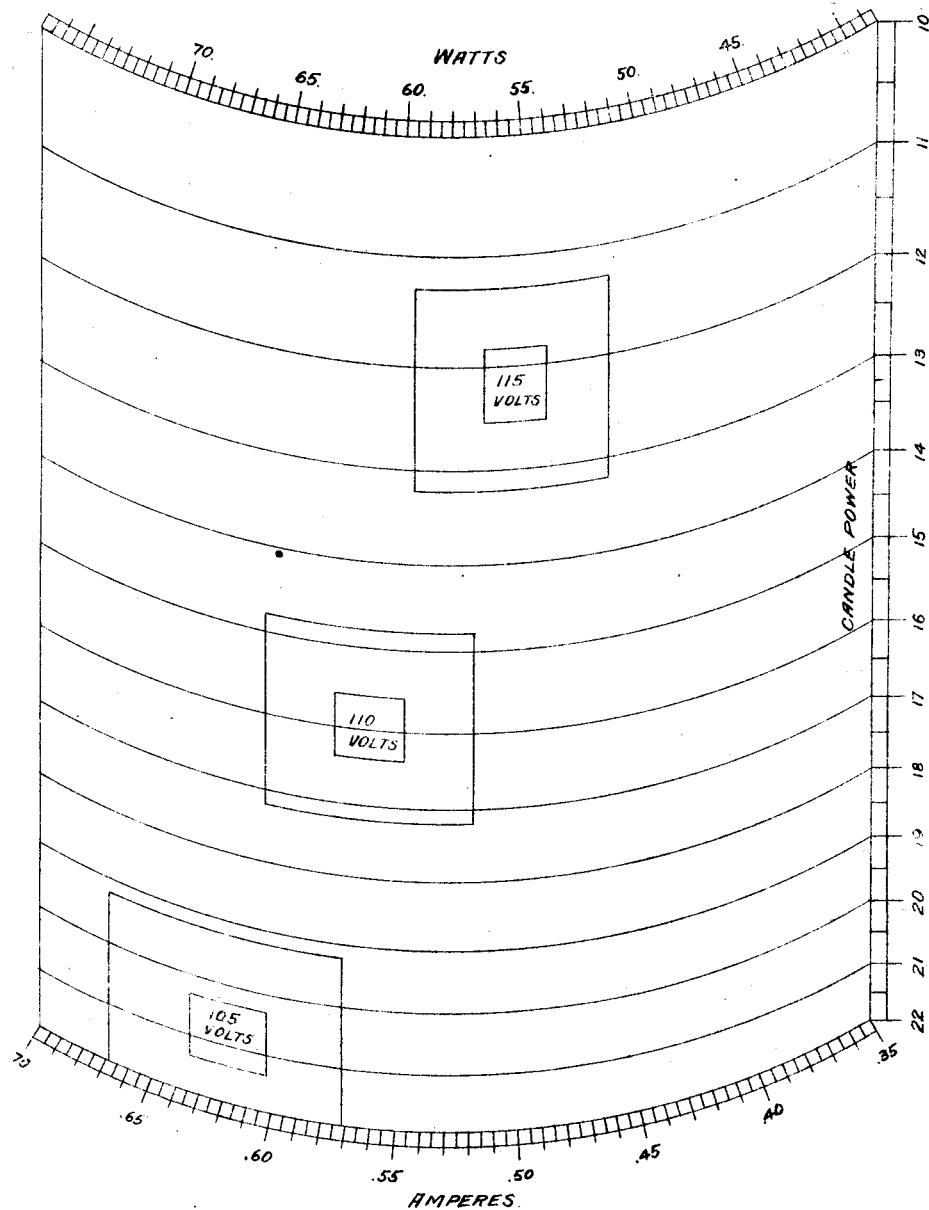

Some producers of incandescent lamps require that, when the lamps are operated at a given voltage, the wattage and candle power of individual lamps should not differ by more than a certain percentage from specified values, and, that the mean values of the wattage and candle power of all of the lamps in a lot or shipment should not vary from the specified values by more than another percentage, which is less than that permissible in individual lamps. In photometering lamps it is highly desirable to obtain a direct indication as to whether or not they will be acceptable to such users, and the chart of Fig. 9 provides a ready means fo. obtaining this information with respect to carbon-filament lamps having a nominal rating of 16 candle power and an efficiency of $3\frac{1}{2}$ watts per candle power when operated at 105, 110 and 115 volts. The chart. is provided with three pairs of concentric polygons bearing the voltage designations of 105, 110 and 115, respectively. If the instrument pointer comes to rest above the inner polygon of any pair, the lamp will be acceptable at the voltage by which the polygon is designated, because it is within both the mean and individual limits of difference from given values in the wattage and candle power; and, if it comes to rest over the space between the inner and outer polygons, it is acceptable as an individual lamp.

In making measurements upon lamps, when the chart of Fig. 9 is used, 110 volts are applied thereto, and, accordingly, the vertical sides of the polygons bearing the 100 volts designation correspond, respectively, to the limiting individual and mean values of the watts, and the curved approximately horizontal sides of the polygons are determined, in position, by the permissible mean and individual variations in the candle power. The polygons bearing the 105 and 115 volt designations are theoretically not accurately located, but their locations are sufficiently accurate for commercial purposes. The centers of these polygons are determined by ascertaining, from the characteristic wattage and candle power curves of lamps of the kind under test, the wattages and candle powers of 105 and 115 volt lamps, respectively, when operated at 110 volts. These points are, of course, accurately located, but the sides of the polygons are located in a manner similar to that described for the polygons bearing 110 volt designations, by assuming that the permissible percentages of variation when the lamps are operated at 110 volts are the same as when operated at 105 and 115 volts.

It will, of course, be understood that while the drawings illustrate many of the modifications and applications of the invention. it is not limited thereto, but may be utilized for other purposes and other conditions.

We claim as our invention:

1. The combination with an electric lamp photometer having a movable member, of a measuring instrument comprising an indicator and a chart, one of which parts is connected with the movable member of the photometer, the chart being provided with marks representing values at which lamps of a certain kind will consume a given number of watts per candle power.

2. The combination with an electric lamp photometer having a movable member, of a measuring instrument comprising an indicator and a chart, one of which parts is connected to the movable member of the photometer, the chart being provided with marks representing amperes at which lamps of a certain kind will consume a given number of watts per candle power.

3. The combination with an electric lamp photometer having a movable member, of a measuring instrument comprising an indicator and a chart, one of which parts is connected to the movable member of the photometer, the chart being provided with marks representing the number of watts consumed by, and the candle power of, lamps of a certain kind when they consume a given number of watts per candle power.

In testimony whereof, we have hereunto subscribed our names this 2nd day of May, 1910.

WILLIAM G. HOUSKEEPER.
H. S. DUNNING.

Witnesses:
CHARLES E. KELLY,
A. YOUNGHOLM.